(No Model.)
F. W. WOLF.
LIQUID RECEPTACLE.
No. 415,428. Patented Nov. 19, 1889.
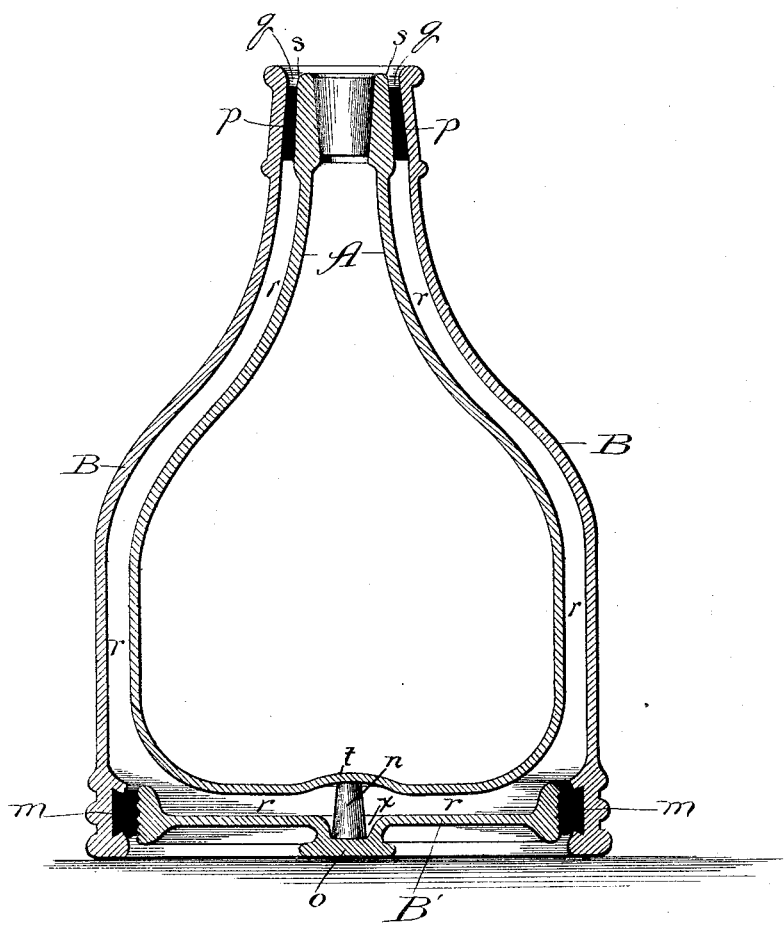
Witnesses:
Chas. E. Gaylord
J. H. Dyrenforth
Inventor:
Frederick W. Wolf.
By Dyrenforth & Dyrenforth
Attys

UNITED STATES PATENT OFFICE.

FREDERICK W. WOLF, OF CHICAGO, ILLINOIS.

LIQUID-RECEPTACLE.

SPECIFICATION forming part of Letters Patent No. 415,428, dated November 19, 1889.

Application filed May 25, 1889. Serial No. 312,119. (No model.)

*To all whom it may concern:*

Be it known that I, FREDERICK W. WOLF, a citizen of the United States, residing at Chicago, in the county of Cook and State of Illinois, have invented a new and useful Improvement in Liquid-Receptacles, of which the following is a specification.

My objects are to provide a portable liquid-receptacle, of an improved construction, for use in holding liquid contents (whether congealed or not) which it is desired to protect from influence upon its temperature by the surrounding atmosphere, and thus preserve the desired condition of the temperature of the contents for a comparatively long time, and to prevent "sweating" by condensation on its external surface, thereby to keep such surface dry and prevent the shedding of moisture from it.

My invention consists in the general construction of my improved device; and it further consists in details of construction and combinations of parts, as hereinafter set forth and claimed.

The accompanying drawing shows a liquid-receptacle of my improved construction, and in vertical section.

A is a bottle, preferably of glass, which may have an indentation or socket $t$, formed centrally in its base, and an externally-tapering head $s$.

B is a casing of glass or other suitable material, and capable of receiving the bottle A, being wider and larger than the latter to afford a dead-air space $r$ between the inner surface of the casing and outer surface of the bottle.

The casing B should be made to conform, substantially, to the shape of the bottle, having its upper portion reduced in circumference and arranged with an opening $q$, somewhat larger than the upper end of the bottle, through which the latter may extend, and containing rubber or other suitable insulating-packing $p$. The casing is provided with a removable bottom B', formed, preferably, of glass, and having a knob $o$ extending from one side and countersunk on its opposite side, as shown at $x$, to afford a socket to receive a support $n$, preferably of rubber, cork, or other insulating material, for the bottle A. The bottle is adjusted into operative position by forcing it into the open base of the casing B, containing insulating-packing $m$, which engages with the edge of the bottom (the latter being threaded, as shown, if desired) and firmly holds it.

When the bottle A is inserted into the casing B and the bottom adjusted, the bottle is rendered immovable by being confined at its head against the insulating-packing $p$ in the head of the casing, and at its base against the support $n$. With the bottle inside its casing the only points of contact between the two are at the top and base, at which points it is thoroughly insulated, as described. The air-space $r$, which practically envelops the entire bottle, operates as an effective non-conductor between the latter and the outside air, thereby protecting the contents against being readily influenced by the surrounding temperature, and the bottle may be conveniently withdrawn from the casing, owing to the ease with which the bottom is removable, to enable the contents with which it is provided to be heated, cooled, or frozen, as desired, within it, when the bottle may then be again as readily passed into the casing and the bottom readjusted.

What I claim as new, and desire to secure by Letters Patent, is—

1. In a portable liquid-receptacle for protecting the contents from the surrounding temperature, the combination of a bottle A and a casing B, having a mouth $q$, an opening in its base through which the bottle may be passed, and an adjustable and removable bottom B' for the open base of the casing, adapted, when adjusted, to confine the bottle against movement in the casing between the mouth and base, the casing and bottle affording between them a close air-space $r$, substantially as described.

2. In a portable liquid-receptacle for protecting the contents from the surrounding temperature, the combination of a bottle A and a casing B, having a mouth $q$, provided with insulating-packing $p$, an open base through which the bottle may be passed, and an adjustable and removable bottom B', provided with a support $t'$, adapted, when the bottom is adjusted, to confine the bottle against movement in the casing between the mouth and base, the casing and bottle affording between them a close air-space $r$, substantially as described.

3. A portable liquid-receptacle for protecting the contents from the surrounding temperature, and comprising, in combination, a bottle A, a casing B, having a mouth $q$, provided with insulating-packing $p$, and an open base containing insulating-packing $m$, and a bottom B', adapted to fit into the base of the casing and be held thereon by the packing $m$, and provided with a knob $o$ and a support $n$, the casing and bottle affording between them a close air-space $r$, the whole being constructed and arranged to operate substantially as described.

FREDERICK W. WOLF.

In presence of—
J. W. DYRENFORTH,
M. J. BOWERS.